United States Patent
Jedruszek et al.

(10) Patent No.: US 12,270,346 B2
(45) Date of Patent: Apr. 8, 2025

(54) METHOD FOR MONITORING A STARTING SEQUENCE OF A TURBOMACHINE AND MONITORING SYSTEM IMPLEMENTING SAID METHOD

(71) Applicant: SAFRAN AIRCRAFT ENGINES, Paris (FR)

(72) Inventors: Marion Marguerite Jedruszek, Moissy Cramayel (FR); Jérôme Henri Noël Lacaille, Moissy Cramayel (FR); Thomas Louis Gaston Dumargue, Moissy Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 247 days.

(21) Appl. No.: 17/794,101

(22) PCT Filed: Dec. 21, 2020

(86) PCT No.: PCT/FR2020/052583
§ 371 (c)(1),
(2) Date: Jul. 20, 2022

(87) PCT Pub. No.: WO2021/148731
PCT Pub. Date: Jul. 29, 2021

(65) Prior Publication Data
US 2023/0051801 A1 Feb. 16, 2023

(30) Foreign Application Priority Data
Jan. 20, 2020 (FR) .................................. 2000525

(51) Int. Cl.
*F02C 7/26* (2006.01)
*F01D 19/00* (2006.01)
*F02C 7/264* (2006.01)

(52) U.S. Cl.
CPC ................ *F02C 7/26* (2013.01); *F01D 19/00* (2013.01); *F02C 7/264* (2013.01); *F05D 2260/85* (2013.01)

(58) Field of Classification Search
None
See application file for complete search history.

(56) References Cited

U.S. PATENT DOCUMENTS

2007/0051111 A1* 3/2007 Uluyol ...................... F02C 7/26
60/800
2007/0234734 A1 10/2007 Uluyol et al.
(Continued)

FOREIGN PATENT DOCUMENTS

FR 2 998 003 A1 5/2014
FR 3 074 836 A1 6/2019
(Continued)

OTHER PUBLICATIONS

International Search Report as issued in International Patent Application No. PCT/FR2020/052583, dated May 6, 2021.

*Primary Examiner* — Todd E Manahan
*Assistant Examiner* — Alyson Joan Harrington
(74) *Attorney, Agent, or Firm* — Pillsbury Winthrop Shaw Pittman LLP

(57) ABSTRACT

A method for monitoring a starting sequence of a turbomachine including a compressor provided with a rotor, a starter capable of rotating the rotor and a combustion chamber, the method including determining a bracketing of a time zone during which the ignition instant takes place, the bracketing being defined by, on the one hand, a lower limit corresponding to an event necessarily taking place before the ignition instant and an upper limit corresponding to an event necessarily taking place after the ignition instant; and determining between the lower limit and the upper limit, a break point in the variation with time of the measurement signal, this break (Continued)

point corresponding to an ignition instant of the air-fuel mixture in the combustion chamber.

15 Claims, 2 Drawing Sheets

(56) References Cited

U.S. PATENT DOCUMENTS

2018/0313721 A1* 11/2018 Labat .................... G01M 15/14
2018/0363494 A1* 12/2018 Foiret .................... F02C 7/264

FOREIGN PATENT DOCUMENTS

WO    WO 2014/125229 A1    8/2014
WO    WO 2017/098124 A1    6/2017

* cited by examiner

METHOD FOR MONITORING A STARTING SEQUENCE OF A TURBOMACHINE AND MONITORING SYSTEM IMPLEMENTING SAID METHOD

CROSS-REFERENCE TO RELATED APPLICATIONS

This application is the U.S. National Stage of PCT/FR2020/052583, filed Dec. 21, 2020, which in turn claims priority to French patent application number 2000525 filed Jan. 20, 2020. The content of these applications are incorporated herein by reference in their entireties.

TECHNICAL FIELD OF THE INVENTION

The present invention relates to a method for monitoring a starting sequence of a turbomachine so as to detect any sign or trend announcing a degradation in the engine that can have an impact on the proper unfolding of the starting sequence of the turbomachine. The invention also relates to a monitoring system implementing this method.

The invention has applications in the fields of monitoring the state of health and of the predictive maintenance of turbomachines, in particular aircraft turbo-jets and turbo-props.

TECHNOLOGICAL BACKGROUND OF THE INVENTION

In the field of turbomachines, for example for aircraft, it is necessary, in the framework of engine regularization and control, to detect the ignition of the engine. Indeed, it is necessary to know if the ignition of the engine has taken place correctly. For this, the starting sequence of the engine is monitored. The term "starting sequence" is used to refer to the set of the following steps, implemented in the order indicated hereinbelow:

1) The starter is turned on,
2) The starter begins to rotate the engine that rotates the high-pressure body and the low-pressure body,
3) The engine speed increases,
4) The fuel is introduced into the combustion chamber,
5) The ignition device, generally a spark plug, is turned on to ignite the air-fuel mixture in the combustion chamber,
6) When the air-fuel mixture is ignited, the engine begins to rotate on its own, and
7) The starter is decoupled from the engine when the latter reaches a stable engine speed.

An incorrect sequence of an initiating operation of turbomachine engine can result, for example, in a poor ignition of the air-fuel mixture in the engine. The absence of ignition can have several origins, including the insufficiency or even the absence of fuel, which can result from the degradation of the fuel pump, of the metering unit, or injectors, or the insufficiency or even the absence of energy, that can result from the degradation of the spark plug or the system for generating sparks.

The degradation of the system that comes into play in a starting sequence of the turbomachine can be monitored through the ignition duration of the air-fuel mixture, which is defined as the duration between the instant of the injection of fuel into the combustion chamber of the engine and the ignition instant of this mixture.

Many methods are known that make it possible to monitor the starting sequence through the ignition duration. However, although the ignition instant of the fuel can easily be detected since it entails a control for regulating the engine (of which the issuing instant is known), the ignition instant is difficult to know precisely given that it can vary according to the conditions of the starting of the engine.

For a monitoring of the ignition sequence in the framework of regulating and controlling the engine, the precision of the ignition instant is not essential, what is important is to know whether or not the ignition has taken place. In the framework of monitoring the state of health (called Health Monitoring) and of the predictive maintenance of turbomachines, monitoring the ignition sequence consists of comparing the ignition sequences with one another, as the flights of the aircraft occur, in order to deduce therefrom the trends and the derivatives and thus predict the breakdowns and conduct preventive actions in order to prevent a non-start event.

It is therefore essential, in the framework of monitoring the state of health and of the predictive maintenance, that the measurements be precise so that the comparison between these successive measurements is reliable. Indeed, any dispersion introduced into the measurements and/or the detections due to an imprecise method would have the effect of generating divergent and therefore unreliable comparison results.

Methods have been proposed to determine the ignition duration for monitoring procedures of the ignition sequence in the framework of monitoring the state of health and of the predictive maintenance, such as that described in patent application FR-2 998 003 A1. This method proposes to determine, at each operation of the engine, the ignition duration—considered as an interval of time between a starting instant and an ignition instant—and to study the derivatives thereof. However, this method does not make it possible to easily distinguish the variations in duration that correspond to degradations in health of the engine from the variations in duration which are linked to measurement imprecision.

Another method, described in patent application WO 2017/098124 A1, proposes to detect the ignition instant by determining the ignition instant as the intersection between a non-linear regression over the variation of the engine speed before ignition and a linear regression over the variation of the engine speed after the ignition instant. FIG. 1 shows, by a curve, an example of the rise in power, as a function of time, of the engine speed of an aircraft turbomachine rotor. This curve shows a first curve portion C1, between the turning on of the starter at instant 0 and the ignition point A, and a second curve portion C2 between the ignition point A and the point of the beginning of stability R. It can be seen, according to the first curve portion C1, that the variation of the engine speed has a semi-parabolic shape to the ignition point A and, according to the second curve portion C2, that the variation of the engine speed increases linearly from point A to point R from which the engine speed becomes stable. When it is stabilized, the engine speed is said to be "idle".

It is understood that, although the ignition instant does correspond to the intersection between the first and second curve portions, respectively C1 and C2, the determining of this intersection depends directly on the non-linear and linear regressions applied and therefore on the adequacy of these regressions at curves C1 and C2. In order for the method of document WO 2017/098124 A1 to work, the regression model, in particular the order of the polynomial, has to be particularly well-suited to the variation profile of the engine speed in the curve portions C1 and C2. However, the form of the variation of the engine speed can vary from one engine to another and even from one starting to another: the global shape of the curve remains identical, but the slopes of curve portions C1 and C2 can be more or less pronounced or more or less flattened. Furthermore, the linearity of the second curve portion C2 is not necessarily perfect. The regressions applied are then incorrect and can be far from the actual curve portions, in particular around the ignition point A. The point of intersection then does not correspond to the ignition instant and can even have physically aberrant values (ignition before injection . . . ). FIG. 2 shows two examples of a variation of engine speed with regressions C'1 and C'2 applied, respectively, to the curve portions C1 and C2 and an intersection I separate from the ignition point A.

In the example of curve 1, the regression C'1 of the curve portion C1 is a second-degree polynomial and the regression C'2 of the curve portion C2 is a first-degree polynomial, their point of intersection being the point I which is offset by a value Δ from the ignition point A. In the example of curve 2, the regression C'1 of the curve portion C1 is a second-degree polynomial and the regression C'2 of the curve portion C2 is a first-degree polynomial, but, due to the existence of a plateau on the curve portion C1, their point of intersection I is determined as being before the injection, which, physically, is entirely impossible.

Thus, not only the determining of the point of intersection depends on the regression applied and can therefore be erroneous, but in addition, since this point of intersection is determined for each one of the startings of the turbomachine, the error can accumulate and introduce dispersion, which makes predicting breakdowns unreliable.

There is therefore a real need for a method for monitoring the engine starting sequence that is sufficiently reliable and precise to be used in the field of monitoring the state of health and the predictive maintenance of turbomachines.

SUMMARY OF THE INVENTION

To respond to the problems mentioned hereinabove of the precision of the ignition duration, the applicant proposes a method for monitoring a starting sequence of an engine wherein a time zone containing the ignition instant is defined prior to any determining of this ignition instant.

According to a first aspect, the invention relates to a method for monitoring a starting sequence of a turbomachine comprising a compressor provided with a rotor, a starter capable of rotating the rotor and a combustion chamber wherein a mixture of air and fuel is ignited by an ignition device, the method comprising the acquisition of a measurement signal of the engine speed of the rotor during the starting sequence and being characterized in that it comprises the following operations:
  determining a bracketing of a time zone during which the ignition instant takes place, the bracketing being defined by, on the one hand, a lower limit corresponding to an event necessarily taking place before the ignition instant and an upper limit corresponding to an event necessarily taking place after the ignition instant; and
  determining, between the lower limit and the upper limit, a break point in the variation with time of the measurement signal, this break point corresponding to an ignition instant of the air-fuel mixture in the combustion chamber.

This monitoring method makes it possible to determine with good precision and good repeatability the ignition instant, in such a way that the derivatives and trends of the starting sequences monitored flight after flight are reliable.

In addition to the characteristics that have just been mentioned in the preceding paragraph, the monitoring method according to an aspect of the invention can have one or more additional characteristics among the following, taken individually or according to any technically permissible combination:
  the lower limit is defined as being the injection starting instant when the fuel begins to enter into the combustion chamber.
  the upper limit is defined as being the end of the starting sequence of the rotor.
  the end of the starting sequence corresponds to the stopping of the ignition device or the reaching of a threshold value of the engine speed or a stabilization of the engine speed in a predefined interval of values.
  the determining of the break point in the variation with time of the measurement signal comprises the following operations:
    a) determining a sliding window,
    b) dividing the window into a first and a second half-windows each one containing a portion of the measurement signal corresponding to a curve portion,
    c) approximating each curve portion by a separate polynomial and determining the dominant coefficient of each one of these curve portions;
    d) comparing the dominant coefficient of the curve portion of the first half-window with the dominant coefficient of the curve portion of the second half-window, and
    e) identifying the window of which the two dominant coefficients are the most different, this window containing the break point in the variation with time of the measurement signal.
  the portion of the measurement signal of each one of the first and second half-windows is approximated by a straight line, its dominant coefficient being a slope.
  the operation d) of comparing slopes comprises a step of determining a difference between these slopes, and the operation e) of identifying the window comprises a step of comparing, over the bracketed time zone, differences between the slopes, with the highest difference corresponding to the break point in the variation with time of the measurement signal.
  the operation d) of comparing slopes comprises a step of statistical testing adapted to reject break points that do not correspond to the ignition instant.
  the determining of the break point in the variation with time of the measurement signal comprises the following operations:
    determining of the derivative in the variation with time of the measurement signal,
    determining a step of this derivative, this step corresponding to the break point in the variation with time of the measurement signal.
  the determining of the break point in the variation with time of the measurement signal comprises the following operations:
    determining a second derivative in the variation with time of the measurement signal,
    comparing this second derivative with a threshold value, and
    identifying the instant when the second derivative becomes greater than the threshold value, this instant corresponding to the break point in the variation with time of the measurement signal.

A second aspect of the invention relates to a system for monitoring a starting sequence of a turbomachine comprising a compressor provided with a rotor, a starter capable of rotating the rotor and a combustion chamber wherein a mixture of air and fuel is ignited by an ignition device, the monitoring system being characterized in that it comprises a calculator configured to implement the operations of the method such as defined hereinabove.

A third aspect of the invention relates to a computer program product comprising program code instructions for the execution of operations of the method such as defined hereinabove.

BRIEF DESCRIPTION OF THE FIGURES

Other advantages and characteristics of the invention shall appear when reading the following description, illustrated by the figures wherein.

DETAILED DESCRIPTION

An embodiment of a method for monitoring a starting sequence of a turbomachine, adapted to allow for a reliable detection of the ignition instant, is described in detail hereinafter, in reference to the accompanying drawings. This example shows the characteristics and advantages of the invention. It is however reminded that the invention is not limited to this example.

In the figures, identical elements are marked by identical references. For questions of legibility of the figures, the scales of size between the elements represented are not respected.

Figure 1:
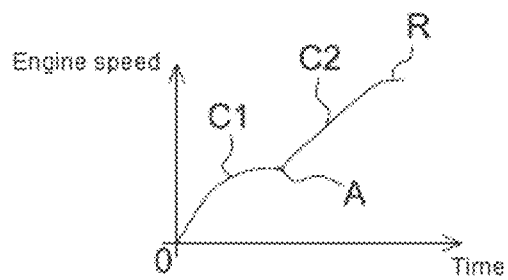
FIG. 1, already described, shows an example of the variation with time of the engine speed of a turbomachine during its starting phase.
Figure 2:
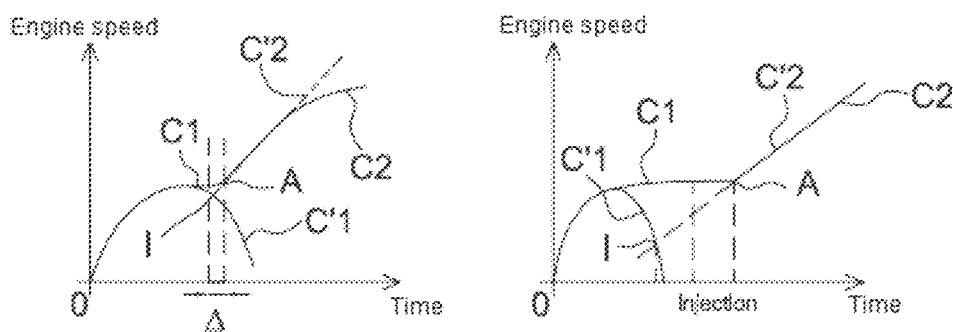
FIG. 2, already described, shows examples of erroneous determinations of the ignition instant with a method of the prior art.
Figure 3:
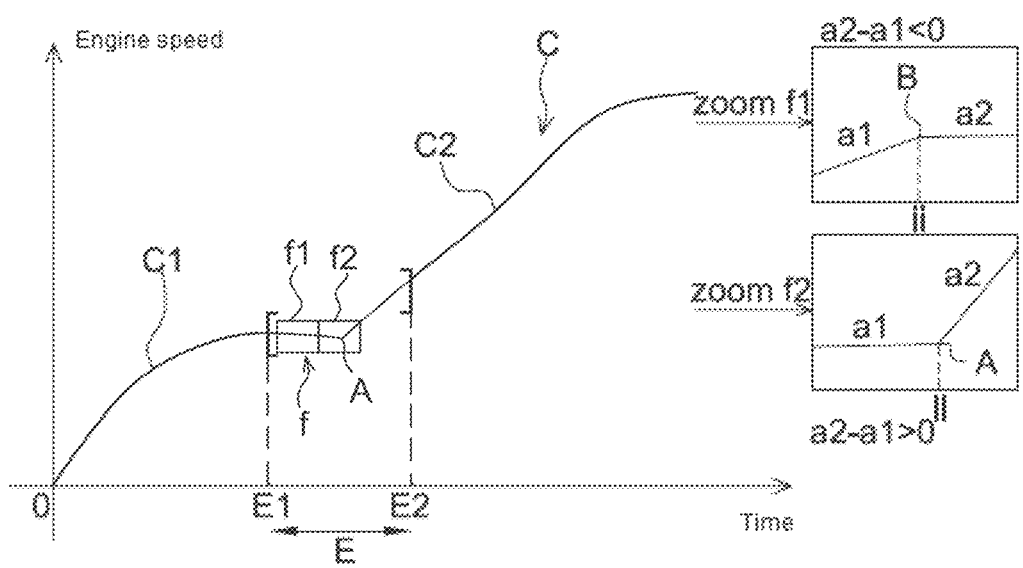
FIG. 3 shows an example of determining the ignition instant with the method according to one of the embodiments of the invention.
Figure 4:
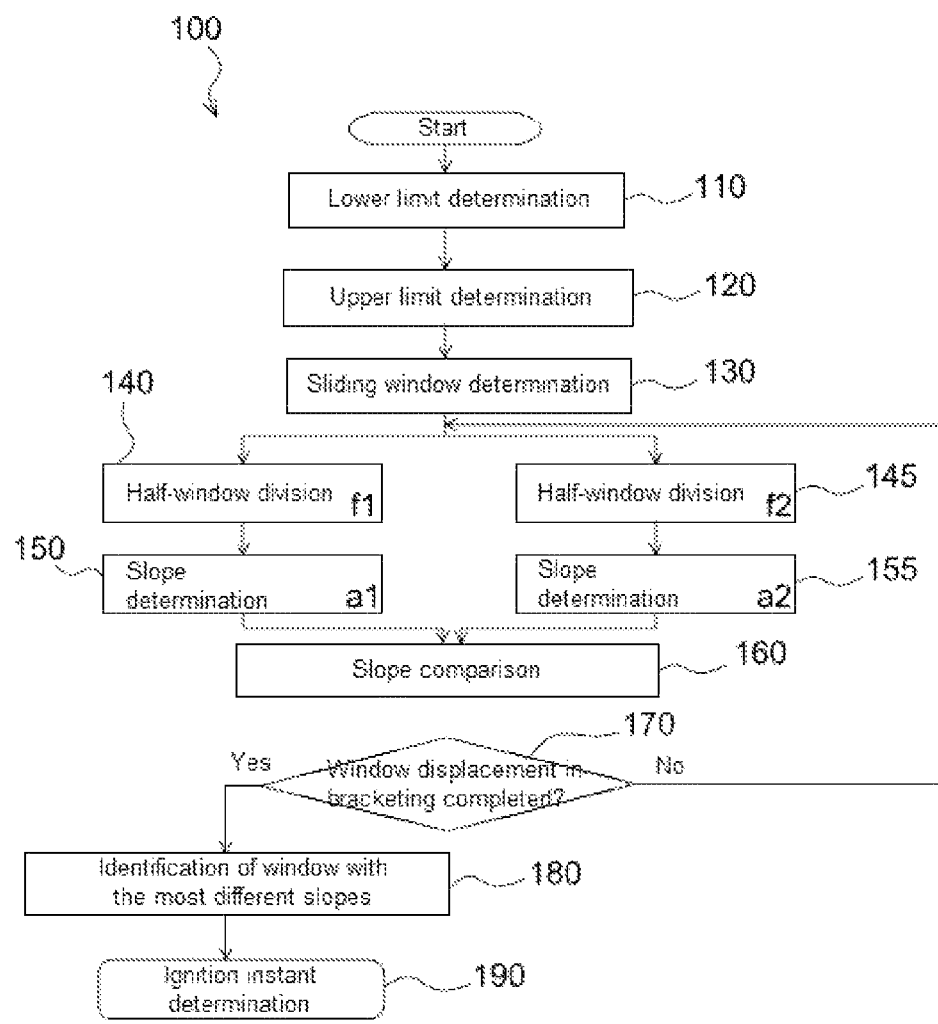
FIG. 4 shows, in the form of a functional diagram, one of the embodiments of the method according to the invention.

An example of a method for monitoring a starting sequence of a turbomachine according to the invention is shown, in the form of a block diagram, in FIG. 3 and in the form of a functional diagram in FIG. 4. The method 100 first proposes to determine (steps 110, 120) a bracketing of the time zone during which the ignition instant occurs. FIG. 3 shows an example of the variation with time of the engine speed of a turbomachine during its starting phase (curve C). This variation with time of the engine speed is a signal measured, for example by tachymeter or sensor, to be used for controlling the turbomachine. In the method of the invention, this signal is also used for detecting the ignition instant.

In the example of the variation with time of the engine speed of FIG. 3, an example of bracketing E is shown that delimits a time zone around the ignition instant A. This bracketing E comprises two limits, called lower limit E1 and upper limit E2, defining respectively a first limit located before the ignition instant takes place and a second limit located after the ignition instant has taken place. The two limits E1 and E2 correspond to two moments or events of the variation with time C that are necessarily temporally located before the ignition instant and after the ignition instant, respectively.

The lower limit E1 can be defined, for example, by a speed threshold or any other data coming from the engine. A sure and easy event to be determined for the lower limit E1 can be, for example, the injection starting instant of the fuel in the combustion chamber. This injection starting instant necessarily takes place before the ignition of the engine and is known since it corresponds to an engine control.

The upper limit E2 can be defined, for example, by a speed threshold or any other data coming from the engine. A sure and easy event to be determined for the upper limit E2 can be, for example, the stopping of the arcing of the spark plugs which is an instant necessarily taking place after the ignition of the engine and which corresponds to engine data (the engine controls the arcing of the spark plugs and the stopping of the arcing). The upper limit E2 can, alternatively, be the end of the starting. The end of the starting corresponds either to the exceeding of a known threshold of the engine speed, or to the stabilization of engine speed in an interval corresponding to the engine speed at which it is supposed to be when it has finished starting.

The operations of determining the lower limit 110 and of determining the upper limit E2 therefore make it possible to define a time zone bracketing the ignition instant. This time zone is chosen, preferably, as small as possible in such a way as to increase the precision and to reduce the processing time of the operations defined in what follows.

Once the bracketing is determined, the method according to the invention proposes to determine, within the bracketing E, the break point A in the variation with time of the engine speed. This break point A corresponds to the ignition instant of the engine. Indeed, the break point A is the point of inflection of the curve C, i.e. the moment when the fuel has ignited and when the engine begins to rotate on its own, without the assistance of the starter. As explained hereinabove, the curve portion C1 corresponds to the engine speed when said engine is driven by the starter and the curve portion C2 corresponds to the engine speed when said engine is rotating on its own. The ignition instant takes place at point A, i.e. at the point where the engine begins to rotate on its own. At this point A, there is a break in the engine speed, this break corresponding to the point of inflection between C1 and C2. Regardless of the engine, the ignition instant is always at the point of inflection A.

The method of the invention therefore proposes to seek this point of inflection A on the curve C. It proposes, in particular, to seek this point of inflection A between the lower and upper limits so as to limit the processing of seeking point A to a limited time zone. For this, several embodiments can be considered.

In the embodiment shown in FIGS. 3 and 4, the determining of the ignition instant A is carried out by seeking the point of inflection between the curve portions C1 and C2, in a sliding window f, displaced between the lower limit E1 and the upper limit E2. For this, the method comprises an operation 130 of determining, or extracting, the sliding window f. This window f is divided into two adjacent half-windows f1, f2 (steps 140, 145). The curve portion C located inside each half-window f1, f2 is approximated by a polynomial. Thus, on each half-window, f1, f2, a polynomial is adjusted, independent of the one of the other half-window. These polynomials can be of the same order or of different orders. Regardless of their order, the two polynomials are separate. The method then proposes to determine the dominant coefficient of each one of these two polynomials and to compare these coefficients, the window of which the two dominant coefficients are the farthest from one another is identified as containing the point of inflection A, or break point.

In certain embodiments, the dimensions of the window, and in particular, its width is a value that can be configured, chosen according to various parameters such as the type of engine or the variation of the engine speed. When the window is chosen sufficiently small, for example of a few points, the curve portion located in each half-window is rather short to be able to be approximated by a first-order polynomial, in other words a straight line. The dominant coefficient of the polynomial is then the slope of the straight line. The method then consists of determining, via mathematical methods well known to those skilled in the art, the slopes a1 and a2 of the curve portions of the first and second half-windows, respectively, f1 and f2 (steps 150 and 155 of the functional diagram of FIG. 4).

The method according to the embodiment of FIG. 4 then consists, in step 160, of comparing the slopes a1 and a2 of the straight lines of the half-windows f1 and f2. The steps 140 to 160 are reiterated until the window has slid over the entire length of the interval comprised between the limits E1 and E2 (step 170). In other words, the calculation of the slopes and the comparison thereof are reiterated for the entire length of the curve C comprised in the bracketing E.

Once the comparison of the slopes a1, a2 is made for the entire curve portion C between the limits E1 and E2, the method proposes to identify (step 180) the window that contains the two slopes that are farthest from one another, this window containing the ignition instant. Indeed, the window of which the two slopes are the most different contains the point of inflection A, the latter corresponding to the ignition instant. The ignition instant is thus obtained (step 190) directly from the detection of the point of inflection A.

According to an embodiment, the comparison of slopes a1, a2 is carried out by calculating the difference (a2−a1) for each window. It is then the window that has the greatest difference that is identified as containing the point of inflection A. Determining the greatest difference (a2−a1) is considered relatively (not absolutely) because it is expected that, during a nominal starting of an engine, the slope after the break point is stronger than the slope before the break point. Considering the difference (a2−a1) relatively makes it possible to eliminate any points of inflection that do not correspond to the ignition (case where a2 would be smaller than a1). FIG. 3 shows an example of a window with two different locations—more simply called first window f1 and second window f2—with an enlargement of each one of these two windows. The enlargement of the window f1 shows a point of inflection B between the straight line of slope a1 and that of slope a2, but this point of inflection is not identified as the ignition instant because (a2−a1)<0. The enlargement of the window f2 shows the point of inflection A between the straight line of slope a1 and that of slope a2, which will be identified as the ignition instant since (a2−a1)>0.

According to an alternative, the operation of comparing slopes a1 and a2 comprises a step of statistical testing adapted to reject any points of inflection that do not correspond to the ignition instant. According to these statistical tests, it is considered that the two slopes a1 and a2 follow Normal laws defined by:

$â \sim N(a, \sigma^2(\Sigma)^{-1})$, where a and σ are known and Σ is the empirical correlation matrix between the data. These laws are approximated by Gaussians and therefore by the relationship: $(a_2-a_1)/\sigma$, where σ is the local standard deviation calculated over the two windows f1 and f2, respectively to the left and to the right of the instant ii and follows a Student's law: T(2 fen_temp−1) that is easy to calibrate according to the expected rejection rate. The rejection rate is the probability of considering that there is a break although there is not one. The rejection rate can be, for example, 5%.

This alternative reverts to detecting the instant when the derivative in the variation with time of the engine speed undergoes a step, or the instant when the second derivative of this variation with time of the engine speed is greater than a predefined threshold. This alternative thus makes it possible to assist in calibrating the threshold from which it is decided that there is a break. It therefore has the advantage of making the detection of the ignition instant even more robust.

According to other embodiments, the determining of the break point A, or point of inflection, can be obtained by means of a derivative in the variation with time of the engine speed (i.e. the curve C) and the detecting of a step on this derivative. Indeed, an estimation of the derivative shows that the latter is almost zero at the point A and rapidly becomes positive again. In other words, the derivative of the curve C is calculated only in the interval between the lower E1 and upper E2 limits and the step is sought in this same interval.

According to other embodiments, the determining of the break point A can be obtained by means of a second derivative in the variation with time of the engine speed (i.e. the curve C) and by detecting the instant when this second derivative becomes higher than a predefined threshold. Indeed, a change in curvature being observed at point A, the second derivative should pass through 0. As in the embodiment hereinabove, the second derivative of the curve C is calculated only in the interval between the lower E1 and upper E2 limits and the instant when the second derivative becomes higher than a threshold value is sought only within this same interval.

The operations described hereinabove to allow for the measurement of the ignition instant can be implemented in various monitoring methods of the starting sequence of a turbomachine and in particular in the framework of the monitoring of the state of health and of the predictive maintenance of turbomachines.

Regardless of the embodiment, the method of the invention makes it possible to easily isolate the break point and therefore to precisely determine the ignition instant. Due to this precision, the method can be implemented in the field of monitoring the state of health of turbomachines, the measurement of the ignition instant able to be successively repeated on each flight without risk of dispersion due to the method so that trends and derivatives can be determined.

The method according to the invention further has the advantage not only of being robust to variations in the form in the variation with time of the engine speed from one flight to another, but also to operate even in the cases where the break in the slope is not very pronounced.

The method of the invention in addition offers the advantage of requiring only one measurement: that of the engine speed, of the high-pressure body or of the low-pressure body. This measurement is already commonly present on the engine because it is necessary for other uses and is generally available with a high sampling frequency, precision and resolution, which is particularly well suited for the implementing of the method according to the invention.

The method such as it has just been described can be implemented in a monitoring system of the starting sequence of a turbomachine. This system comprises a compressor provided with a rotor, also called engine, and a starter capable of rotating the rotor before the ignition phase. The system also comprises a combustion chamber wherein an air-fuel mixture is ignited by an ignition device—for example a spark plug—in order to ensure the rotation of the rotor on its own. The system in addition comprises a calculator, on the ground or onboard, configured to execute the operations of the method according to the invention.

Although described through a certain number of examples, alternatives and embodiments, the method for monitoring a starting sequence according to the invention comprises various alternatives, modifications and improvements that shall appear obvious to those skilled in the art, with the understanding that these alternatives, modifications and improvements are part of the scope of the invention.

The invention claimed is:

1. A method for monitoring a starting sequence of a turbomachine comprising a compressor provided with a rotor, a starter capable of rotating the rotor and a combustion chamber wherein a mixture of air and fuel is ignited by an ignition device, the method comprising:
    acquiring a measurement signal of an engine speed of the rotor during the starting sequence;
    determining a bracketing of a time zone during which an ignition instant takes place, the bracketing being defined by a lower limit corresponding to a first event necessarily taking place before an ignition instant and an upper limit corresponding to a second event necessarily taking place after the ignition instant; and
    determining, between the lower limit and the upper limit, a break point in a variation with time of the measurement signal, said break point corresponding to the ignition instant of the air-fuel mixture in the combustion chamber,
    determining a break point in the variation with time of the measurement signal comprising:
        a) determining a sliding window which is displaced between the lower limit and the upper limit,
        b) dividing the sliding window into a first half-window and a second half-window, each one of the first half-window and the second half-window containing a portion of the measurement signal corresponding to a curve portion,
        c) approximating each curve portion by a separate polynomial and determining a dominant coefficient of each one of the curve portions,
        d) comparing the dominant coefficient of the curve portion of the first half-window with the dominant coefficient of the curve portion of the second half-window, and
        e) reiterating steps b)-d) until the sliding window has slid over an entire length of the time zone, and then identifying a half-window from the first and second half-windows of which the two dominant coefficients are the most different, said half-window containing the break point in the variation with time of the measurement signal.

2. The method for monitoring according to claim 1, wherein the lower limit is defined as being an injection starting instant when the fuel begins to enter into the combustion chamber.

3. The method for monitoring according to claim 1, wherein the upper limit is defined as being an end of the starting sequence of the rotor of the turbomachine.

4. The method for monitoring according to claim 3, wherein the end of the starting sequence corresponds to a stopping of the ignition device or a reaching of a threshold value of the engine speed or a stabilisation of the engine speed in a predefined interval of values.

5. The method for monitoring according to claim 1, wherein the portion of the measurement signal of each one of the first and second half-windows is approximated by straight lines, the dominant coefficient of each of said straight lines being a respective slope.

6. The method for monitoring according to claim 5, wherein: the operation d) of the comparing the dominant coefficient of the curve portion of the first half-window with the dominant coefficient of the curve portion of the second half-window comprises determining a difference between the respective slopes of the straight lines of the first and second half-windows, and
    the operation e) of identifying the half-window comprises comparing, over the bracketed time zone, differences between the respective slopes, with a highest difference corresponding to the break point in the variation with time of the measurement signal.

7. The method for monitoring according to claim 5, wherein the operation d) of the comparing the dominant coefficient of the curve portion of the first half-window with the dominant coefficient of the curve portion of the second half-window comprises comparing the respective slopes via statistical testing adapted to reject a point of inflection that does not correspond to the ignition instant.

8. A system for monitoring a starting sequence of a turbomachine comprising a compressor provided with a rotor, a starter capable of rotating the rotor and a combustion chamber wherein a mixture of air and fuel is ignited by an ignition device, the monitoring system comprising a calculator configured to implement the operations of the method according to claim 1.

9. A non-transitory computer readable medium comprising program code instructions for the execution of operations of the method according to claim 1.

10. A system for monitoring a starting sequence of a turbomachine comprising a compressor provided with a rotor, a starter capable of rotating the rotor and a combustion chamber wherein a mixture of air and fuel is ignited by an ignition device, the monitoring system comprising a calculator configured to implement the operations of the method according to claim 7.

11. A non-transitory computer readable medium comprising program code instructions for the execution of operations of the method according to claim 7.

12. The method for monitoring according to claim 1, wherein the first half-window and the second half-window are adjacent.

13. A method for monitoring a starting sequence of a turbomachine comprising a compressor provided with a rotor, a starter capable of rotating the rotor and a combustion chamber wherein a mixture of air and fuel is ignited by an ignition device, the method comprising:
    acquiring a measurement signal of an engine speed of the rotor during the starting sequence;
    determining a bracketing of a time zone during which an ignition instant takes place, the bracketing being defined by a lower limit corresponding to a first event necessarily taking place before the ignition instant and an upper limit corresponding to a second event necessarily taking place after the ignition instant; and
    determining, between the lower limit and the upper limit, a break point in a variation with time of the measurement signal, said break point corresponding to the ignition instant of the air-fuel mixture in the combustion chamber, determining the break point in the variation with time of the measurement signal comprising:
determining a second derivative in the variation with time of the measurement signal, comparing the second derivative with a threshold value, and
identifying the ignition instant when the second derivative becomes greater than the threshold value, said ignition instant corresponding to the break point in the variation with time of the measurement signal.

14. A system for monitoring a starting sequence of a turbomachine comprising a compressor provided with a rotor, a starter capable of rotating the rotor and a combustion chamber wherein a mixture of air and fuel is ignited by an ignition device, the monitoring system comprising a calculator configured to implement the operations of the method according to claim 13.

15. A non-transitory computer readable medium comprising program code instructions for the execution of operations of the method according to claim 13.

* * * * *